US008428636B2

(12) United States Patent
Baker et al.

(10) Patent No.: US 8,428,636 B2
(45) Date of Patent: Apr. 23, 2013

(54) RADIO COMMUNICATION SYSTEM FOR SELECTING A SUBSET OF AVAILABLE PRIMARY STATIONS

(75) Inventors: Matthew P. J. Baker, Canterbury (GB); Timothy J. Moulsley, Caterham (GB); Bernard Hunt, Redhill (GB)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 1913 days.

(21) Appl. No.: 10/043,532

(22) Filed: Jan. 11, 2002

(65) Prior Publication Data
US 2002/0094834 A1 Jul. 18, 2002

(30) Foreign Application Priority Data

Jan. 13, 2001 (GB) .................................. 0100991.9
Feb. 15, 2001 (GB) .................................. 0103716.7

(51) Int. Cl.
*H04B 7/00* (2006.01)
(52) U.S. Cl.
USPC .............................. 455/522; 455/69; 370/318
(58) Field of Classification Search .................. 455/522, 455/68, 436, 437, 442, 69; 370/331, 318
See application file for complete search history.

(56) References Cited

U.S. PATENT DOCUMENTS

| | | | | |
|---|---|---|---|---|
| 6,351,642 B1 * | 2/2002 | Corbett et al. | ............... | 455/442 |
| 6,373,823 B1 * | 4/2002 | Chen et al. | ................... | 370/252 |
| 6,385,462 B1 * | 5/2002 | Baum et al. | ................... | 455/522 |
| 6,603,752 B1 * | 8/2003 | Saifuddin et al. | ............. | 370/335 |
| 6,603,971 B1 * | 8/2003 | Mohebbi | ........................ | 455/437 |
| 6,801,512 B1 * | 10/2004 | Cudak et al. | ................... | 370/332 |
| 6,862,275 B1 * | 3/2005 | Dabak | ........................... | 370/342 |
| 6,862,449 B1 * | 3/2005 | Mohebbi et al. | .............. | 455/437 |
| 2001/0011024 A1 * | 8/2001 | Lundby et al. | ................ | 455/522 |
| 2002/0009061 A1 * | 1/2002 | Willenegger | ................. | 370/328 |

FOREIGN PATENT DOCUMENTS

| | | |
|---|---|---|
| EP | 0797318 A2 | 9/1997 |
| EP | 0897225 A2 | 2/1999 |
| EP | 1067816 A1 | 1/2001 |
| WO | 9900914 A1 | 1/1999 |
| WO | 0223763 A1 | 3/2002 |

OTHER PUBLICATIONS

PHGB000121, U.S. Appl. No. 09/951,638, filed Sep. 13, 2001, Entitled: Secondary Station and Method of Operating the Station. Inventors: Matthew P.J. Baker, Timothy J. Moulsley.

* cited by examiner

*Primary Examiner* — Raymond Dean

(57) ABSTRACT

A radio communication system comprises a secondary station (110) having a plurality of communication channels (226a,226b,226c) with a plurality of primary stations (100a, 100b,100c). Separate closed loop power control is performed for each of the communication channels (226a,226b, 226c). This enables the optimum primary station for transmission of data to the secondary station (110) to be selected. Parameters derived from operation of each power control loop enable optimum setting of channel parameters for each primary station (100a,100b,100c).

Such an arrangement is particularly suitable for a high speed downlink data service, where the fast selection of the optimum primary station and/or channel parameters improves link robustness and system throughput.

19 Claims, 3 Drawing Sheets

RADIO COMMUNICATION SYSTEM FOR SELECTING A SUBSET OF AVAILABLE PRIMARY STATIONS

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to 4 Mbps.

In known radio communication systems, at any one time a MS generally communicates with a single Base Station (BS). During the course of a call the MS may wish to investigate transferring to another BS, for example when the quality of the communication link deteriorates as the MS moves away from its BS, or when the relative traffic loading of different cells requires adjusting. The process of transferring from one BS to another is known as handover.

In a system operating according to the current UMTS specifications, the MS maintains a list of BSs known as the "active set" with which radio links of reasonable quality can be maintained. When the MS is in dedicated channel mode, and there are multiple BSs in the active set, the MS is in "soft handover" with the BSs in the active set. In this mode uplink transmissions are received by all BSs in the active set, and all BSs in the active set transmit substantially the same downlink information to the MS (typically the data and most of the control information would be the same, but power control commands could be different). A drawback of this "soft handover" approach is that the uplink and downlink transmission powers cannot be optimised for each individual radio link, as only one set of power control commands is transmitted in the uplink, while the power control commands transmitted over the downlink from different BSs may result in conflicting requirements for the uplink transmission power.

The normal soft handover procedure is particularly suitable for real time services such as voice links, where a continuous connection must be maintained. For packet data links, however, it can be advantageous to select the optimum BS for the transmission of each data packet to a MS, to allow for dynamically changing radio link and traffic conditions. Improved system throughput can be achieved if the selection of the optimum BS is made immediately prior to transmission of each packet, by minimising the number of packets received in a corrupted state and also minimising total transmitted power per packet.

In addition to, or instead of, choice of the optimum BS, other characteristics of the link for transmission of the data packet need to be set. In a UMTS system these characteristics may include a suitable Modulation and Coding Scheme (MCS) and an appropriate transmission power level. It is also desirable to minimise the signalling required to provide such facilities.

An object of the present invention is therefore to enable improved data throughput in such a system.

According to a first aspect of the present invention there is provided a radio communication system having physical control channels arranged for the bidirectional transmission of sets of control information between a secondary station and a plurality of primary stations, and at least one data channel between one or more primary stations, selected from the plurality of primary stations, and the secondary station for the transmission of data from the or each selected primary station to the secondary station, wherein respective closed-loop power control means are provided for adjusting individually the power of some or all physical control channels, or parts thereof, to which a set of control information is mapped.

By enabling rapid selection of the optimum BS at any moment, a number of advantages are provided. In particular, the delay before transmission of each packet is reduced, while accurate power control at the start of each packet is ensured even if the transmitting BS has changed.

Further, the choice of MCS is assisted by the extra information obtained by operating a plurality of parallel power control loops. By rapid selection of the optimum BS and/or improved choice of MCS, overall system throughput is improved while requiring minimal additional signalling.

According to a second aspect of the present invention there is provided a primary station for use in a radio communication system having physical control channels arranged for the bidirectional transmission of sets of control information between a secondary station and a plurality of primary stations, and at least one data channel between one or more primary stations, selected from the plurality of primary stations, and the secondary station for the transmission of data from the or each selected primary station to the secondary station, wherein closed-loop power control means are provided for adjusting the power of some or all physical control channels between the primary station and the secondary station, or parts thereof, to which a set of control information is mapped.

According to a third aspect of the present invention there is provided a secondary station for use in a radio communication system having physical control channels arranged for the bidirectional transmission of sets of control information between the secondary station and a plurality of primary stations, and at least one data channel between one or more primary stations, selected from the plurality of primary stations, and the secondary station for the transmission of data from the or each selected primary station to the secondary station, wherein closed-loop power control means are provided for adjusting individually the power of some or all physical control channels, or parts thereof, to which a set of control information is mapped.

According to a fourth aspect of the present invention there is provided a method of operating a radio communication system having physical control channels arranged for the bidirectional transmission of sets of control information between a secondary station and a plurality of primary stations, and at least one data channel between one or more primary stations, selected from the plurality of primary stations, and the secondary station for the transmission of data from the or each selected primary station to the secondary station, the method comprising operating respective closed-loop power control means for adjusting individually the power of some or all physical control channels, or parts thereof, to which a set of control information is mapped.

The present invention is based upon the recognition, not present in the prior art, that by operating multiple parallel closed power control loops the fast selection of suitable sites and/or choice of MCS for data transmission is facilitated and improved operation of a data transmission system may be enabled.

Embodiments of the present invention will now be described, by way of example, with reference to the accompanying drawings, wherein.

In the drawings the same reference numerals have been used to indicate corresponding features.

Figure 1:
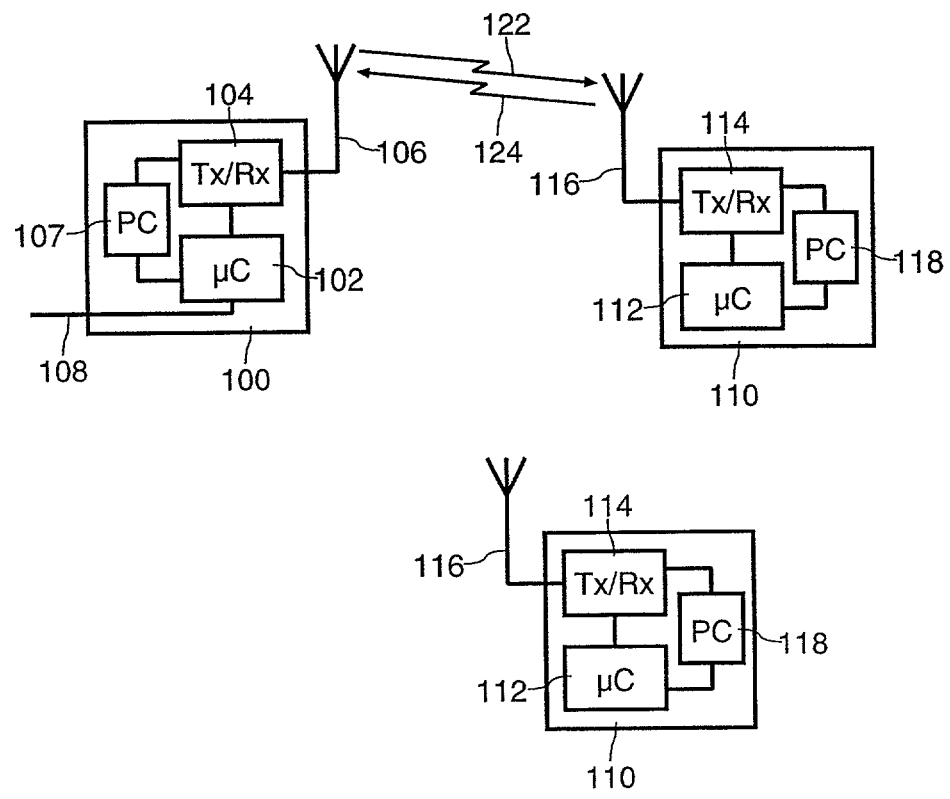
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (µC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (µC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

In many radio communication systems, power control is normally operated in a closed loop manner. For uplink power control in a UMTS system the BS 100 determines the required changes in the power of transmissions from a MS 110 and signals these changes to the MS 110 by means of Transmit Power Control (TPC) commands. To minimise overheads, a TPC command typically instructs the MS 110 to increase or decrease its power, with the change in power being a step of predetermined size. However, in some systems a TPC command may also determine the step size to be used. Similarly, for downlink power control the MS 110 determines the required changes and signals them to the BS 100 using TPC commands.

In a system made in accordance with the present invention, closed loop power control may also be used to choose parameters such as the most appropriate MCS, since the power level requested by the MS 110 for a downlink physical channel provides an indication of prevailing radio link conditions. Hence, there is no need for an separate uplink message to be transmitted by the MS 110 to the BS 100 to indicate radio link conditions.

Figure 2:
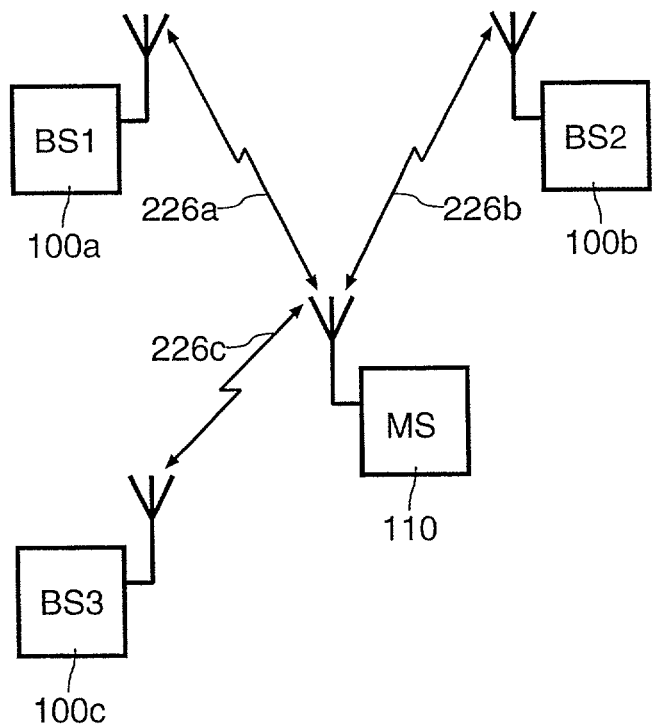
FIG. 2 is a block schematic diagram of a radio communication system with a MS in the process of soft handover.

A MS 110 engaged in a soft handover process is illustrated in FIG. 2, the MS 110 having three two-way communication channels 226a,226b,226c, each comprising an uplink and a downlink channel, with three respective BSs 100a,100b, 100c. In a given time slot the MS 110 receives TPC commands from each of BSs 100a,100b,100c on the downlink channels, and transmits TPC commands to each of the BSs on the uplink channels. In a conventional UMTS system, each MS 110 only transmits one set of uplink TPC commands to all BSs 100a,100b,100c in the active set. Hence, although there is a form of power control loop the powers of the downlink channels are not individually controlled.

In a system made in accordance with the present invention, parallel closed power control loops are set up between a MS 110 and a plurality of BSs 100a,100b,100c to enable a fast BS selection process. Such power control loops could be maintained between the MS 110 and some or all of the BSs 100a, 100b,100c in the active set. Such power control loops would be used to control the power of at least some or all of the downlink transmissions to the MS 110, and further such power control loops could also be used to control the power of the respective uplink transmissions. These BSs would probably be chosen to be those in the active set which had the best quality radio links. The closed power control loops with these BSs would enable a very fast selection to be made between them to decide which BS 100a, 100b, 100c should transmit a packet to the MS 110.

As an example, the BS to use for the transmission of a packet could be chosen to be the BS with the lowest transmit power on the power-controlled physical control channels. The selection could be made either by the MS 110 (by transmitting a BS-selection message to the network) or by the network. The closed loop power control ensures that the transmit power on the downlink channel is already at an appropriate level for the radio link conditions, and it could be used to help predict the most appropriate MCS and/or other parameters.

The operation of multiple parallel closed power control loops requires the transmission of respective multiple sets of control information in both the uplink and the downlink. As a minimum if such parallel closed power control loops are only used to control the power of downlink transmissions, each set of uplink control information would comprise one or more TPC commands derived from the corresponding downlink set of control information, and each set of downlink control information would comprise one or more sets of pilot information from which the TPC commands in the corresponding uplink set of control information could be derived by means of a technique such as Signal to Interference Ratio (SIR) estimation. If further such parallel closed power control loops are used to control the power of uplink transmissions, each set of uplink control information would further comprise one or more sets of pilot information from which the TPC commands in the corresponding downlink set of control information could be derived, and each set of downlink control information would further comprise one or more TPC commands derived from the corresponding uplink set of control information.

First consider the uplink. The MS 110 has to transmit a plurality of sets of uplink control information, including TPC commands. In the embodiments described below this is achieved either by mapping each set of control information to a separate uplink physical control channel or by time-multiplexing all the sets of control information into one physical control channel, or some combination of the two techniques. Other techniques could also be used, for example coding combinations of TPC commands or using higher order modulation schemes.

The first technique involves transmitting separate uplink physical control channels to each of the BSs 100a,100b,100c which have been chosen to participate in the fast site selection process. In a UMTS implementation, these separate uplink physical control channels would all use the same scrambling code (to identify the MS 110). The uplink physical control channel for each BS 100a,100b,100c could be distinguished by means of one or both of the following methods, for example:

Code multiplexing, in which each physical control channel uses a different orthogonal channelisation code. In the current UMTS specifications, only one uplink physical control channel is permitted from each MS 110, and it always uses a predetermined channelisation code, having a spreading factor of 256 from an OVSF (Orthogonal Variable Spreading Factor) code tree. The additional physical control channels could use any of 63 of the other channelisation codes from the same set while remaining orthogonal to all possible channelisation codes used for uplink data channels.

I/Q multiplexing. In the current UMTS specifications, the uplink control information is coded on a physical channel which uses the the Q (quadrature-phase) component of the carrier, together with up to 3 data channels, and up to 3 data channels are coded on the I (in-phase) component (prior to complex scrambling). If only 2 uplink sets of control information were required, and no uplink data was being transmitted at the same time, the sets of control information could be I/Q multiplexed (prior to complex scrambling) while using the same channelisation code, thus avoiding the need for multicode transmission for the control channels. It would also be possible to transmit two sets of control information, one on each of the I and Q components, while transmitting a reduced amount of data, with the use of multicode transmission.

Advantageously, the timing of uplink transmissions could be arranged to ensure that there was no need for multicode transmission. For example, it could be arranged for one of the uplink physical control channels to be temporarily switched off whenever some uplink data is to be transmitted.

Control channel gating, i.e. intermittent transmission of a physical control channel, could be used in conjunction with the above methods as a means of reducing MS power consumption and uplink interference levels.

Figure 3:
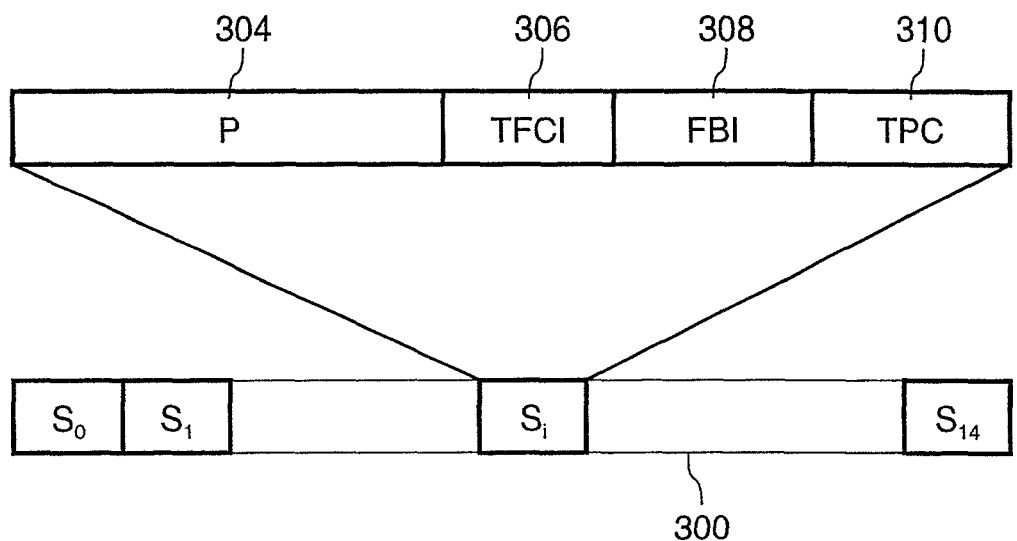
FIG. 3 is a diagram of a known UMTS uplink slot structure.

The second technique is time-multiplexing the sets of control information for different BSs, using a modified type of uplink physical control channel. In this case only one uplink physical control channel would be required, using only one channelisation code. FIG. 3 illustrates the structure of a frame 300 of a UMTS uplink physical control channel. The frame 300 has a length of 10 ms and comprises 15 slots $S_0$ to $S_{14}$. Each slot has a length of 2560 chips and includes 10 bits of control data. Considering the $i^{th}$ slot $S_i$, it comprises a Pilot (P) field 304, a Transport Format Combination Indicator (TFCI) field 306, a FeedBack Information (FBI) field 308 and a TPC field 310, each field having a predetermined number of bits.

Figure 4:
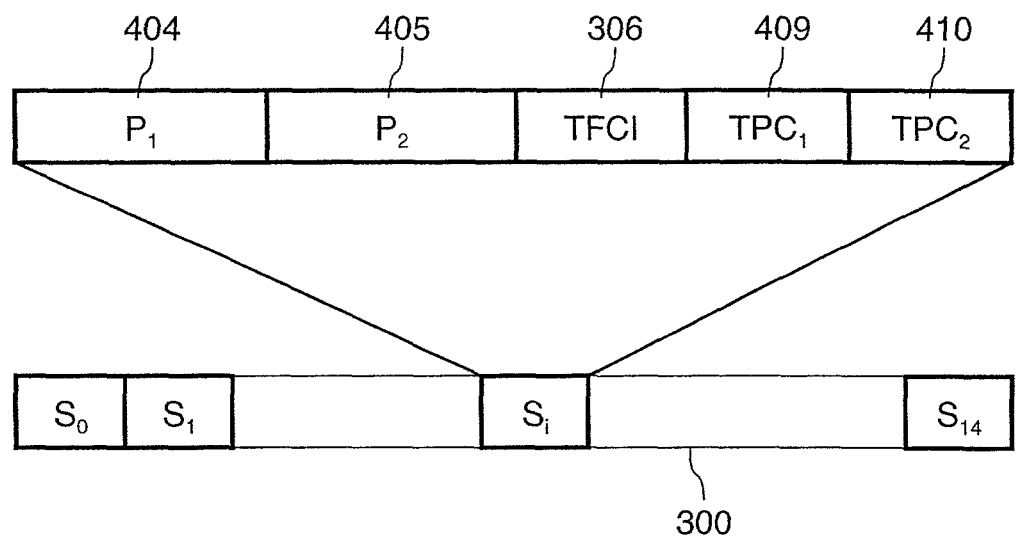
FIG. 4 is a diagram of a UMTS uplink slot structure according to the present invention.

Time-multiplexing of the TPC commands and pilot fields could then be achieved by one or both of the following methods:

Modifying the fields in the uplink physical control channel to permit multiple sets of TPC commands and pilot information to be transmitted at the usual 1500 Hz slot rate. The TFCI could be transmitted once, at the highest power required for communication with all relevant BSs 100a,100b,100c. This could include reducing the amount of pilot information sent to each BS. FIG. 4 illustrates a frame 300 having a modified field structure in accordance with the present invention for use with two BSs. Two pilot fields $P_1$ 404 and $P_2$ 405 are provided, together with two power control fields $TPC_1$ 409 and $TPC_2$ 410. The TFCI field 306 is unchanged from the field structure of FIG. 3, while the FBI field 308 has been dropped (because there may be no need for accurate transmitter diversity information if only control information is being transmitted). It will be apparent that there are a range of other ways of modifying the field structure to accommodate the requirements of the present invention.

Reducing the power control rate to each cell. For example, halving the power control rate in a scenario where two BSs participate in the fast-selection process avoids the need for any modification to the frame field structure. Each BS only responds to every other TPC command, and similarly uses only every other pilot field for SIR estimation. The TPC rate could be reduced even further (for example in slowly-changing radio links with low Doppler frequency) by "gating off" the physical control channel.

Now consider the downlink. Each BS 100a,100b,100c which is participating in the fast-selection process has to transmit pilot information to the MS 110 in order to maintain the closed power control loop for the downlink. If the uplinks are also controlled by closed loop power control, the BSs also have to transmit TPC commands to the MS 110. This is similar to the normal soft handover process, except that each BS 100a,100b,100c calculates its downlink TPC commands based on the SIR of its respective parts of the respective uplink physical control channel. Possible methods for the downlink include use of different scrambling codes or time-multiplexing of transmissions.

Different scrambling codes could be used to distinguish the sets of control information from the different BSs 100a,100b, 100c. This would enable the MS 110 to process the downlink pilot information from each BS separately, so as to generate the different uplink TPC commands required for the different BSs according to their respective downlink SIRs. This would also enable the MS 110 to distinguish TPC commands from the different BSs.

Instead of combining TPC commands received from the different BSs as in the normal soft handover process, for example as disclosed in our co-pending unpublished United Kingdom patent application 0022633.2 (applicants' reference PHGB000121), the MS 110 would adjust the power of each uplink physical control channel (or each part of an uplink physical control channel in the case of time-multiplexed sets of uplink control information) separately according to the TPC commands received from the relevant BS 100a,100b,100c.

Alternatively, the downlink sets of control information from the different BSs 100a,100b, 100c could be time-multiplexed in a similar manner to the uplink as discussed above. In this case it may be preferable to combine multiplexing with gating, to avoid synchronisation problems between BSs, in which case the downlink pilot information rate and/or TPC command rate could likewise be reduced.

In embodiments of a system made in accordance with the present invention, certain restrictions could be applied to the uplink transmission powers from the MS 110 to the different BSs 100a,100b,100c. For example, the transmission power ratio between the transmissions to different BSs could be limited to e.g. 6 dB, thereby avoiding the generation of substantial interference in one cell because a BS in another cell requests more power while still providing sufficient dynamic range to maintain an adequate uplink error rate for TPC commands. Such a restriction also improves EMC behaviour by avoiding sudden and regular changes in power, and simplifies implementation of a MS 110 by avoiding the need to be able to implement accurately regular large changes in power.

Alternatively, in the event of the MS 110 reaching its maximum transmission power (according to its power class or as signalled by the network), the primary aim could be to maintain the correct uplink transmission power for the BS 100a, 100b,100c with the best downlink SIR. The uplink transmission power to the other BSs could be reduced in order to achieve this. If this resulted in the power ratio between the transmissions to different BSs becoming greater than any pre-determined limit, for example the 6 dB limit proposed above, the transmissions to one or more of the BSs other than that having the best downlink SIR could be terminated, or alternatively the transmission power of the transmissions to all the BSs could be scaled down.

In practical implementations, the number of parallel closed power control loops would probably be restricted to 2 or 3 to avoid the complexity of the implementation eliminating the benefits of the fast-selection technique.

Figure 5:
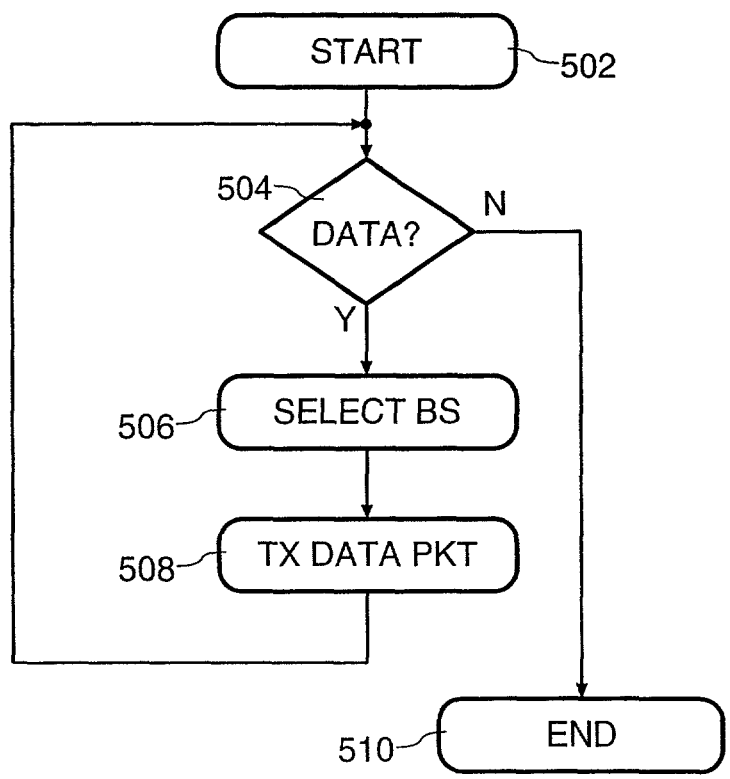
FIG. 5 is a flow chart showing a method of transmitting data in accordance with the present invention.

A flow chart illustrating a method in accordance with the present invention of transmitting data via one of a plurality of BSs 100a,100b,100c is shown in FIG. 5. The method starts, at step 502, when there is data for transmission to a MS 110. Step 504 is a test to determine whether any data remains for transmission. If it does then the BS 100a,100b,100c having the best overall characteristics is selected from those available to the MS 110 for fast selection, at step 506, and a data packet is transmitted to the MS 110 at step 508. The process of testing for data, selecting a BS and transmitting a data packet continues until there is no more data to transmit, when the test 504 for more data fails and the process ends, at step 510.

In practice the amount of data transmitted before BS selection is performed again may be more than one packet, depending on the system overheads of changing the transmitting BS.

In a further embodiment, the operation of multiple power control loops could be used to facilitate the selection of the most appropriate MCS for packet transmission from a BS 100 to a MS 110 when the control channels are in soft handover. This may be done independently of the method used to decide which BS 100a,100b,100c should send the downlink packet. It is already known that MCS selection can be based on an estimate of the likely SIR which would be obtained at the MS 110. It is further known that a value for this estimated SIR can be transmitted from the MS to the BS in the form of a measurement report (or derived from other measurements such as signal strength of a pilot channel).

However, if such measurement reports are sent using higher layer signalling, there is likely to be a significant interval between them. This may lead to significant errors in MCS selection in time varying channels. It is also known that the operation of closed loop power control on the downlink transmission can be used to make corrections to an earlier SIR estimate, since any changes in transmitted power will be well correlated with changes in downlink path loss, and hence the achievable SIR at the MS 110. However, in soft handover, the changes in downlink transmitted power from each BS 100a, 100b,100c are not likely to be sufficiently well correlated with changes in the respective downlink path losses. Therefore in soft handover, the use of multiple power control loops for downlink control channels will allow the power level of the downlink channel from each BS in the active set (or subset of the active set) to independently track changes in the respective radio channels. This means that, given suitable measurement reports, the SIR achievable at the MS 110 can be estimated for any BS in the active set (or subset of the active set). The appropriate MCS for packet transmission can then be selected.

In the embodiments described above the data channel is transmitted to the MS 110 from one BS at a time. However, it may be advantageous in some circumstances for data channels to be transmitted simultaneously from more than one BS. For example, in a situation where three BSs 100a, 100b, 100c are under closed loop power control, if two of the BSs provide an equally good link quality the data packet or packets may be transmitted concurrently from those two base stations (in a similar manner to transmissions during soft handover).

In a variation on the embodiments described above, there could be more than one data link between a primary and a secondary station. For example, the invention could be applied to radio links at different frequencies, or transmitted from different antennas, which will require separate power control even if they are between the same pair of stations.

In a system in which a BS 100 has a plurality of antennas 106, or antenna beams, references above to selection of a preferred BS 100 for packet transmission should be taken to include selection of a preferred subset of antennas or antenna beams from those provided by one or more primary stations. In a system employing Multi-Input Multi-Output (MIMO) techniques, selection of a preferred BS 100 should also be understood to include selection of an optimum radio path or set of paths between a primary station 100 and a secondary station 110.

From reading the present disclosure, other modifications will be apparent to persons skilled in the art. Such modifications may involve other features which are already known in the design, manufacture and use of radio communication systems and component parts thereof, and which may be used instead of or in addition to features already described herein. It will be appreciated that certain features of the invention which are, for clarity, described in the context of separate embodiments may also be provided in combination in a single embodiment. Conversely, various features of the invention which are, for brevity, described in the context of a single embodiment may also be provided separately or in any suitable subcombination. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system having physical control channels arranged for the bi-directional transmission of sets of control information between a secondary station and a plurality of primary stations, wherein respective closed-loop power control means are provided for individually adjusting the power of some or all physical control channels, or parts thereof, to which a set of control information is mapped, said closed-loop power control means being utilized to select a subset of primary stations greater than one primary station, selected from the plurality of primary stations, for the transmission of data over at least one data channel between the selected subset of primary stations and the secondary station.

2. The system as claimed in claim 1, further comprising means for encoding each downlink physical control channel, or part thereof, to which a set of control information is mapped with a respective scrambling code to enable the associated primary station to be identified.

3. The system as claimed in claim 1, further comprising means for transmitting power control commands relating to each downlink physical control channel, or part thereof, to which a set of control information is mapped via the single time-multiplexed uplink physical channel.

4. The system as claimed in claim 1, further comprising means responsive to requests from the secondary station for selecting the primary station connected to the data channel.

5. The system as claimed in claim 1, further comprising means for establishing a plurality of communication links between a primary station and the secondary station, for determining which of the primary stations comprise selected primary stations, and for determining which of the communication links are selected.

6. A primary station for use in a radio communication system having physical control channels arranged for the bi-directional transmission of sets of control information between a secondary station and a plurality of primary stations, and at least one data channel between a selected subset of primary stations greater than one primary station, selected from the plurality of primary stations, and the secondary station for the transmission of data over the at least one data channel, wherein closed-loop power control means are provided for adjusting the power of some or all physical control channels between the plurality of primary stations and the secondary station, or parts thereof, to which a set of control information is mapped, said closed-loop power control means being utilized to select the subset of primary stations.

7. The primary station as claimed in claim 6, further comprising means for acquiring or releasing a data channel in response to changing radio link conditions to become or cease to be a selected primary station.

8. The primary station as claimed in claim 6, further comprising means for determining operational parameters of the data channel depending on the power level of a physical control channel, or part thereof, to which a set of control information is mapped.

9. The primary station as claimed in claim 8, wherein the operational parameters are at least one of modulation and coding schemes.

10. A secondary station for use in a radio communication system having physical control channels arranged for the bi-directional transmission of sets of control information between the secondary station and a plurality of primary stations, and at least one data channel between a selected subset of primary stations greater than one primary station, selected from the plurality of primary stations, and the secondary station for the transmission of data over the at least one data channel, wherein closed-loop power control means are provided for adjusting individually the power of some or all physical control channels between the plurality of primary stations and secondary station, or parts thereof, to which a set of control information is mapped, said closed-loop power control means being utilized to select the subset of primary stations.

11. The secondary station as claimed in claim 10, further comprising means for determining which of the primary stations comprise the selected primary station in response to changing radio link conditions.

12. The secondary station as claimed in claim 10, further comprising means for transmitting each set of uplink control information over a separate physical channel.

13. The secondary station as claimed in claim 12, further comprising means for distinguishing the physical channels by use of different channelisation codes.

14. The secondary station as claimed in claim 12, further comprising means for distinguishing two of the physical channels by transmitting a first physical channel which uses the in-phase component of the carrier and a second physical channel which uses the quadrature-phase component of the carrier.

15. The secondary station as claimed in claim 14, further comprising means for interrupting an uplink physical control channel when uplink data transmission is required.

16. The secondary station as claimed in claim 10, further comprising means for achieving the time-multiplexing by including separate power control relating to each primary station with which sets of control information are exchanged in a single physical control channel.

17. A method of operating a radio communication system comprising:
    arranging physical control channels arranged for the bi-directional transmission of sets of control information between a secondary station and a plurality of primary stations;
    arranging at least one data channel between a selected subset of primary stations greater than one primary station, selected from the plurality of primary stations, and the secondary station for the transmission of data over the at least one data channel;
    operating respective closed-loop power control means for adjusting individually the power of some or all physical control channels, or parts thereof, to which a set of control information is mapped to select the subset of primary stations.

18. The secondary station as claimed in claim 10, further comprising means for transmitting each set of uplink control information time-multiplexed over a single physical channel.

19. The secondary station as claimed in claim 18, further comprising means for achieving the time-multiplexing by reducing the rate of transmission of power control commands.

* * * * *